US007182275B1

(12) United States Patent
Wang

(10) Patent No.: US 7,182,275 B1
(45) Date of Patent: Feb. 27, 2007

(54) TRAVELING SPRINKLER STRUCTURE COMPRISING SPRAY UNIT ROTATABLE AND ADJUSTABLE IN HEIGHT

(76) Inventor: Hsin-Fa Wang, P.O. Box 453, Taichung (TW)

( * ) Notice: Subject to any disclaimer, the term of this patent is extended or adjusted under 35 U.S.C. 154(b) by 782 days.

(21) Appl. No.: 10/612,895

(22) Filed: Jul. 7, 2003

(51) Int. Cl.
*A01G 25/06* (2006.01)
*B05B 15/10* (2006.01)
*B05B 15/06* (2006.01)
*A62C 31/24* (2006.01)

(52) U.S. Cl. ...................... 239/200; 239/203; 239/210; 239/280; 239/280.5; 239/281

(58) Field of Classification Search ................ 239/164, 239/200, 203, 210, 273, 280, 280.5, 281, 239/282, 753
See application file for complete search history.

(56) References Cited

U.S. PATENT DOCUMENTS 1,959,886 A * 5/1934 Willard .................. 239/280.5
4,521,036 A * 6/1985 Howell et al. ................ 285/61
4,813,638 A * 3/1989 Garcia ........................ 248/171
4,824,020 A * 4/1989 Harward ..................... 239/264
5,452,872 A * 9/1995 Barnes et al. ................. 248/85
5,836,516 A * 11/1998 Van Epps et al. ........ 239/280.5

* cited by examiner

*Primary Examiner*—Davis Hwu
(74) *Attorney, Agent, or Firm*—Egbert Law Offices

(57) ABSTRACT

A sprinkler structure comprises a support unit, a spray unit, and at least one fastening unit. A water pipe of the spray unit is uprightly supported by the support unit along with the fastening unit comprising a tubular seat, a press block, and a control lever. The tubular seat is provided with a center through hole to accommodate the water pipe, and a through slot in which the press block is pivoted. The control lever is provided at a pivoting end with an eccentric press surface and is fastened pivotally with two pivoting lugs of the tubular seat such that the eccentric press surface pushes the press block to arrest the water pipe at the time when the control lever is swiveled in one direction. The press block releases the water pipe at the time when the control lever is swiveled in other direction.

2 Claims, 8 Drawing Sheets

TRAVELING SPRINKLER STRUCTURE COMPRISING SPRAY UNIT ROTATABLE AND ADJUSTABLE IN HEIGHT

BACKGROUND OF THE INVENTION

1. Field of the Invention

The present invention relates generally to a sprinkler, and more particularly to a sprinkler structure comprising a support unit and a spray unit rotatable and adjustable in height.

2. Description of Related Art

The conventional traveling sprinkler structure comprises a support unit and a spray unit fastened with the support unit. The spray unit can be adjusted up and down by means of an adjustment structure comprising a rack and a gear. The rack-gear mechanism is complicated in construction and is therefore not cost-effective. In addition, the rack-gear mechanism does not allow the spray unit to be adjusted up and down with ease and speed. In light of a specific orientation of the rack and the gear, the spray unit can not be rotated.

SUMMARY OF THE INVENTION

The primary objective of the present invention is to provide a traveling sprinkler structure comprising a support unit and a spray unit. The support unit is formed of a plurality of support legs for supporting the spray unit on a surface. The spray unit is formed of a water pipe and a nozzle. The water pipe is uprightly supported by the support legs of the support unit in conjunction with two fastening members, each being formed of a tubular seat, a press block, and a control lever. The tubular seat is provided with a center through hole and a side slot in communication with the center through hole. The press block is pivoted in the side slot. The water pipe is put through the center through hole of the tubular seat. The tubular seat is fastened fixedly with the top end of the support legs. The control lever is pivoted to the tubular seat and is provided with an eccentric press surface capable of pushing the press block to move toward or away from the water pipe. By manipulating the control lever, the water pipe can be rotated or moved up and down.

The features and the advantages of the present invention will be more readily understood upon a thoughtful deliberation of the following detailed description of the present invention with reference to the accompanying drawings.

DETAILED DESCRIPTION OF THE INVENTION

As shown in FIGS. 1–7, a traveling sprinkler structure embodied in the present invention comprises a support unit, a spray unit, and a fastening unit.

The support unit is formed of a support frame 1 comprising a plurality of support legs 11.

Figure 9:
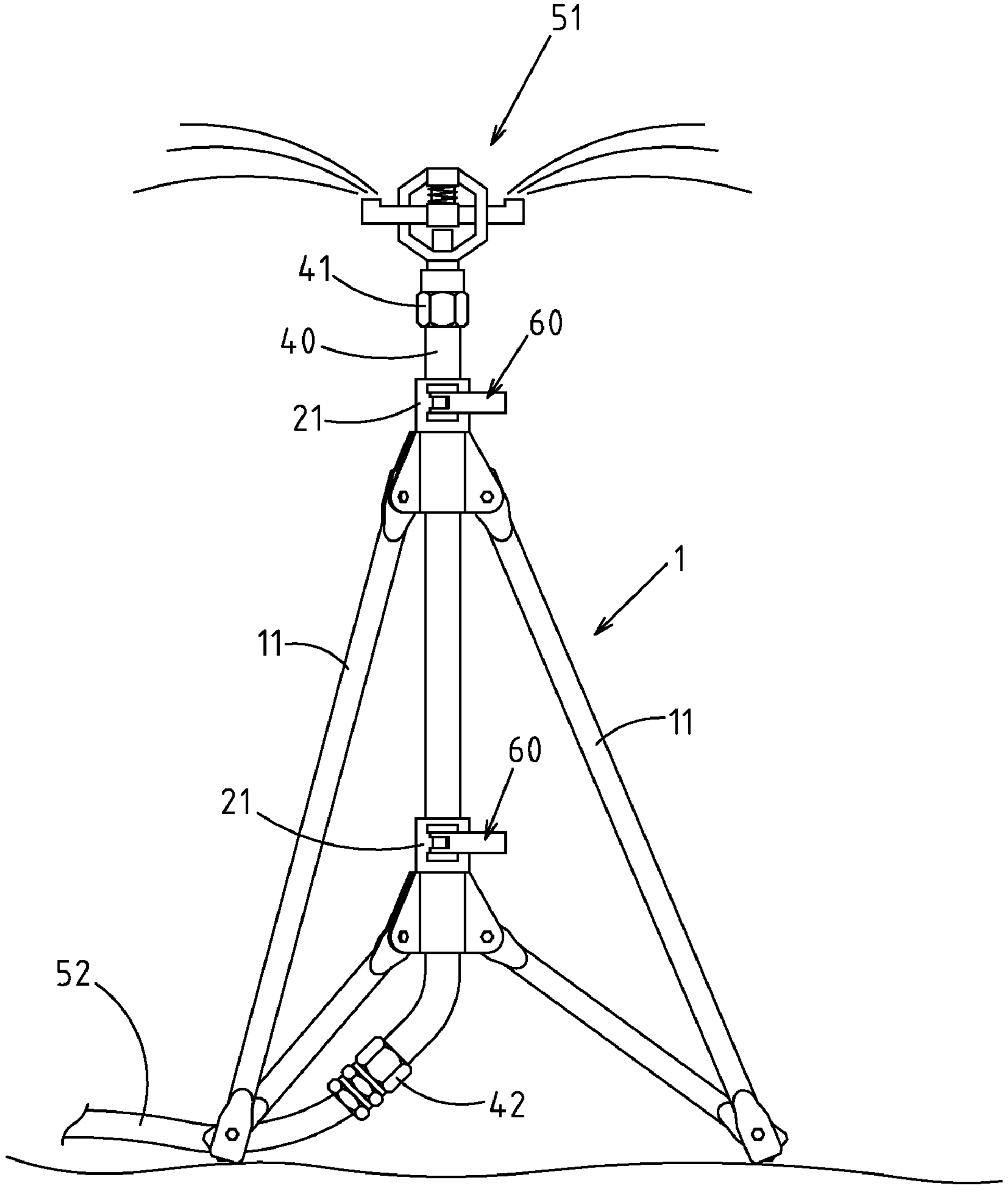
FIG. 9 shows a schematic view of the traveling sprinkler structure of the present invention at work.

The spray unit is formed of a water pipe 40 and a nozzle 51 which is shown in FIG. 9. The water pipe 40 is uprightly supported by the support frame 1 and is provided at a top end with a nozzle connector 41 for connecting the nozzle 51. The water pipe 40 is further provided at a bottom end with a hose connector 42 for connecting a hose 52, as shown in FIG. 9.

The fastening unit is formed of an upper fastening member 20A and a lower fastening member 20B and is used to fasten the water pipe 40 with the support legs 11 of the support frame 1. The two fastening members 20A and 20B are identical in structure and function. For this reason, only the upper fastening member 20A will be described hereinafter with reference to FIGS. 1–7.

As shown in FIGS. 2–7, the fastening member 20A is formed of a tubular seat 21, a press block 30, and a control lever 60. The tubular seat 21 is provided with a center through hole 23, through which the water pipe 40 is put. The tubular seat 21 is provided in an outer wall with two pivoting lugs 24. The tubular seat 21 is further provided in the wall with a through slot 25 extending from the outer wall between the two pivoting lugs 24 such that the through slot 25 is in communication with the center through hole 23. The tubular seat 21 is provided in the inner wall of the center through hole 23 with a locating slot 26 extending from an inner end of the through slot 25 through a top end of the center through hole 23. The tubular seat 21 is fastening at a lower end with a top end of the support legs 11 of the support frame 1.

The press block 30 is provided in an inner end with an arcuate surface 31 corresponding in curvature to the outer wall of the water pipe 40. The press block 30 is further provided in the inner end with a projection 32 extending uprightly therefrom. The press block 30 is pivoted in the through slot 25 of the tubular seat 21 such that the arcuate surface 31 is extended into the center through hole 23 of the tubular seat 21, and that the projection 32 is received in the locating slot 26 of the tubular seat 21.

The control lever 60 has a pivoting end 61 which is provided with an eccentric press surface 64. The control lever 60 has an activation end 63 opposite to the pivoting end 61. The control lever 60 is pivoted at the pivoting end 61 to the pivoting lugs 24 of the tubular seat 21 by a pivot 62 such that the eccentric press surface 64 of the control lever 60 is corresponding in location to the press block 30.

Figure 1:
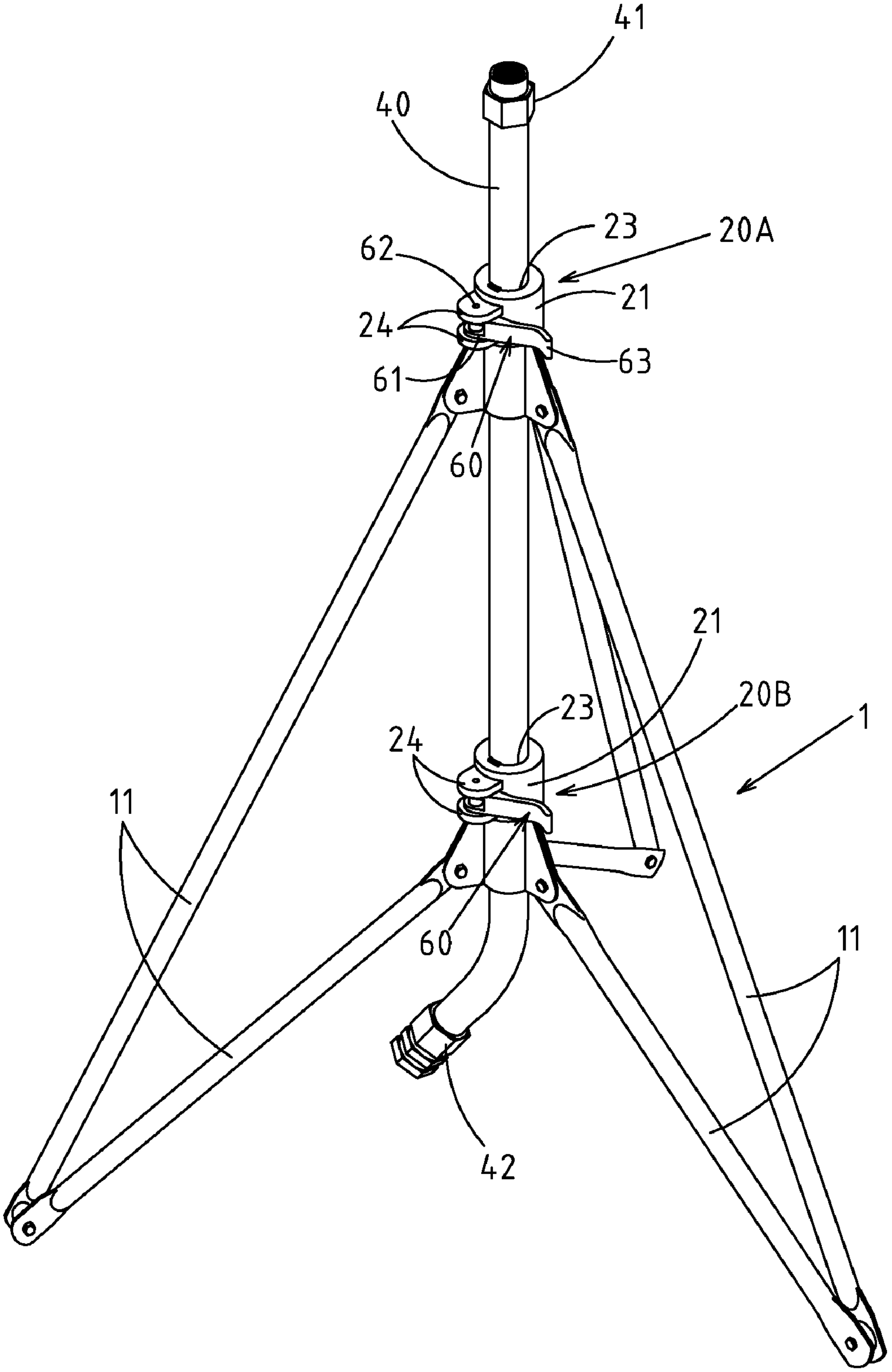
FIG. 1 shows a perspective view of the present invention.
Figure 2:
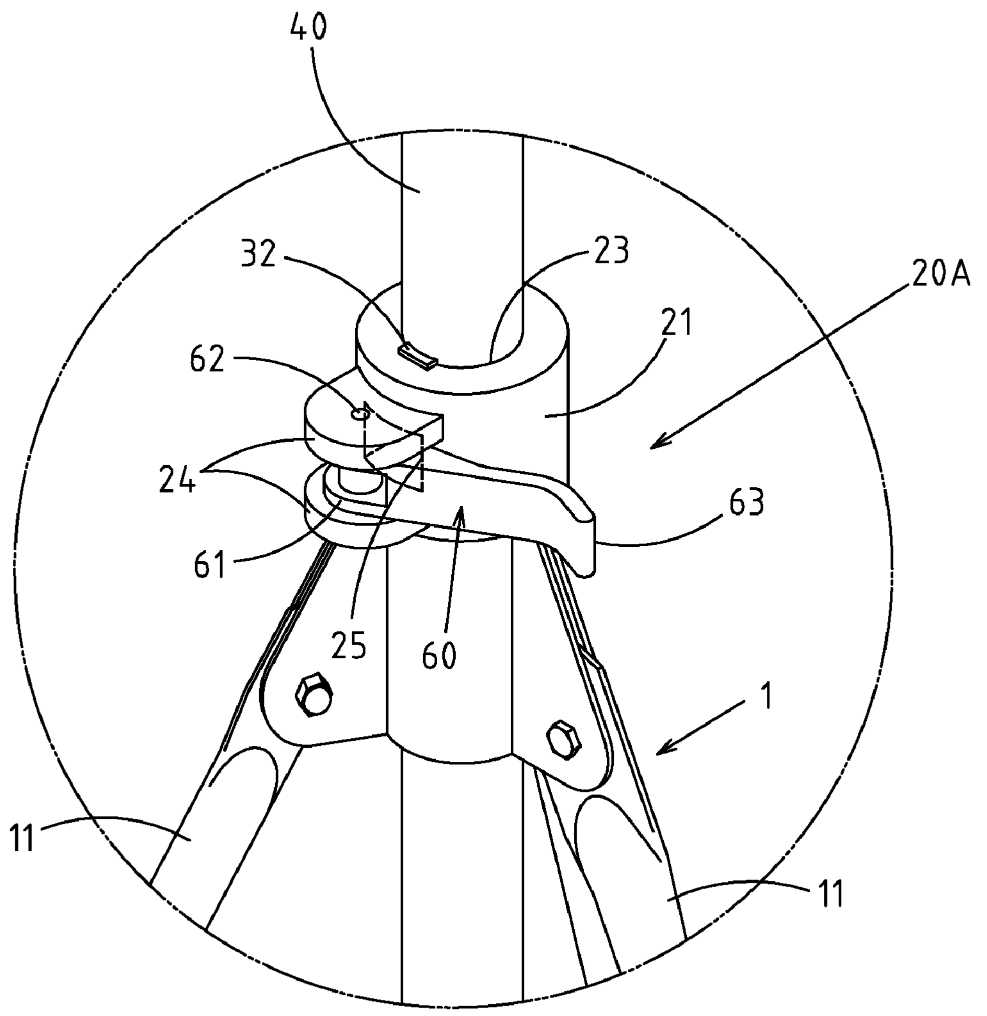
FIG. 2 shows an enlarged perspective view of the fastening member of the present invention.
Figure 3:
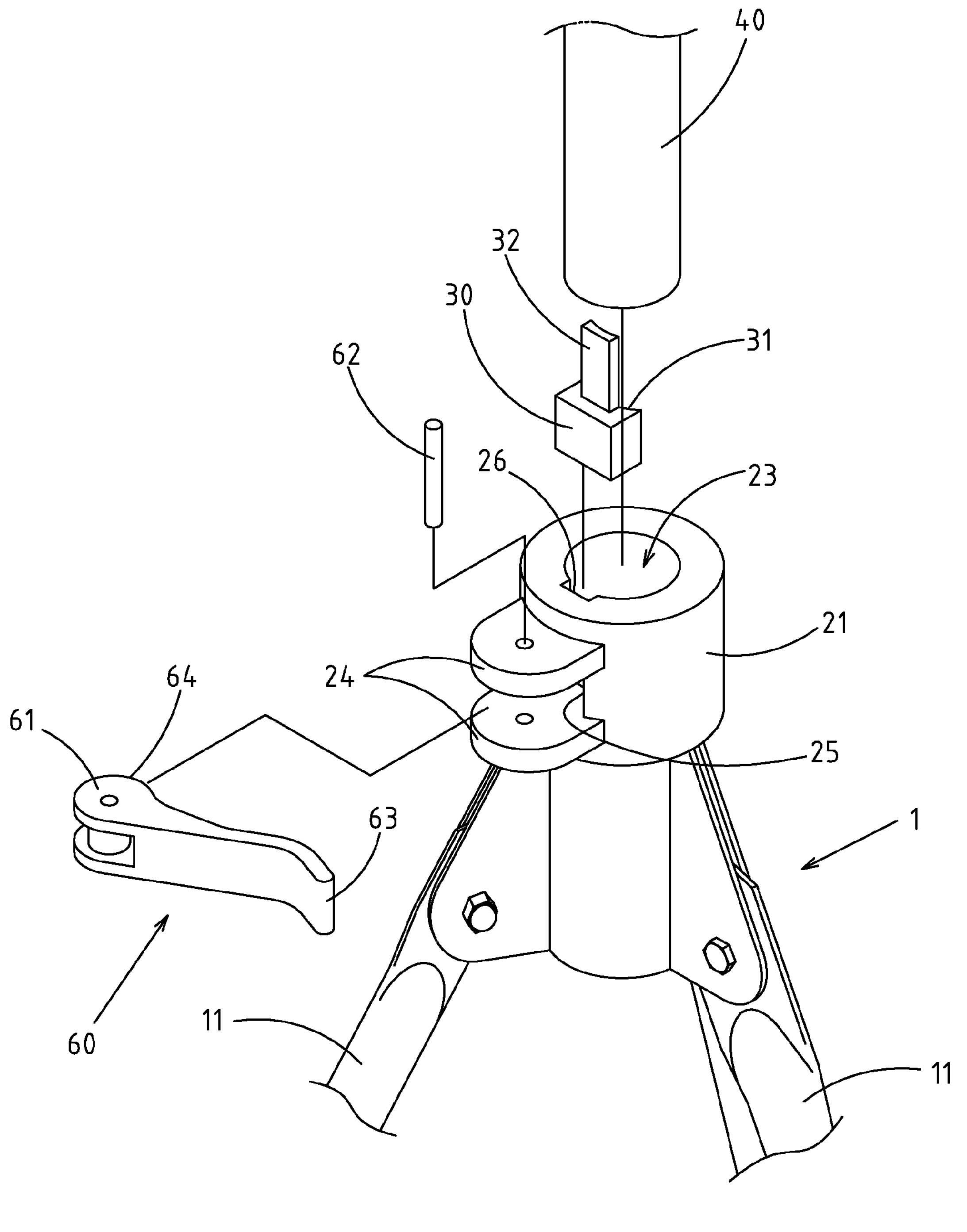
FIG. 3 shows an exploded view of the fastening member of the present invention as shown in FIG. 2.
Figure 4:
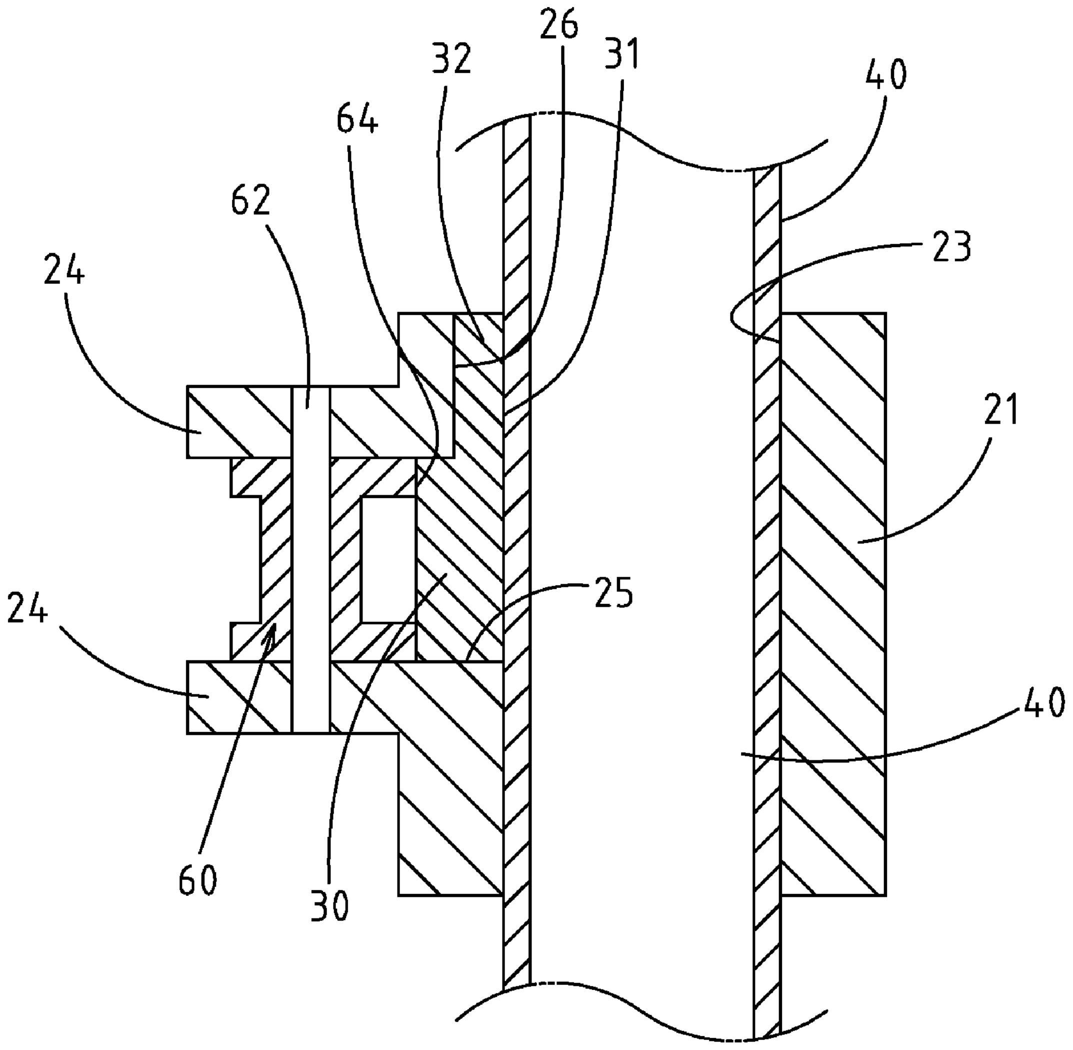
FIG. 4 shows a partial longitudinal sectional view of the present invention as shown in FIG. 2.
Figure 5:
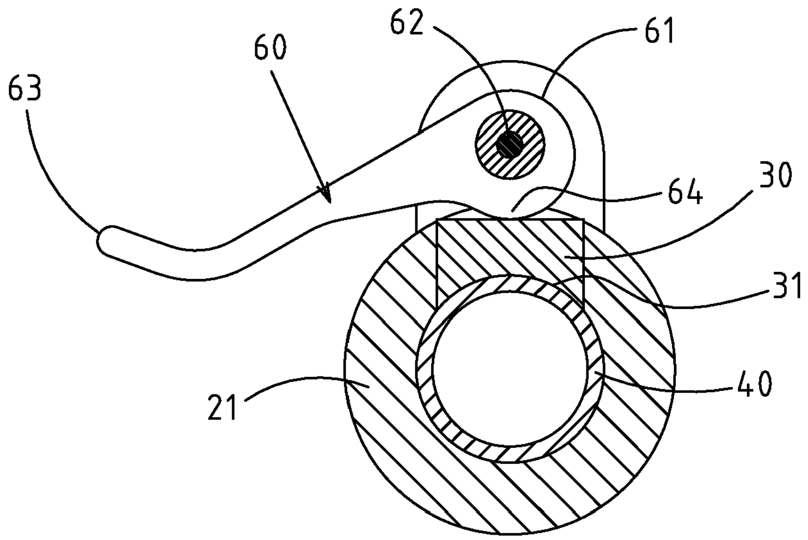
FIG. 5 shows a cross-sectional schematic view of the fastening member of the present invention in the fastening state.
Figure 6:
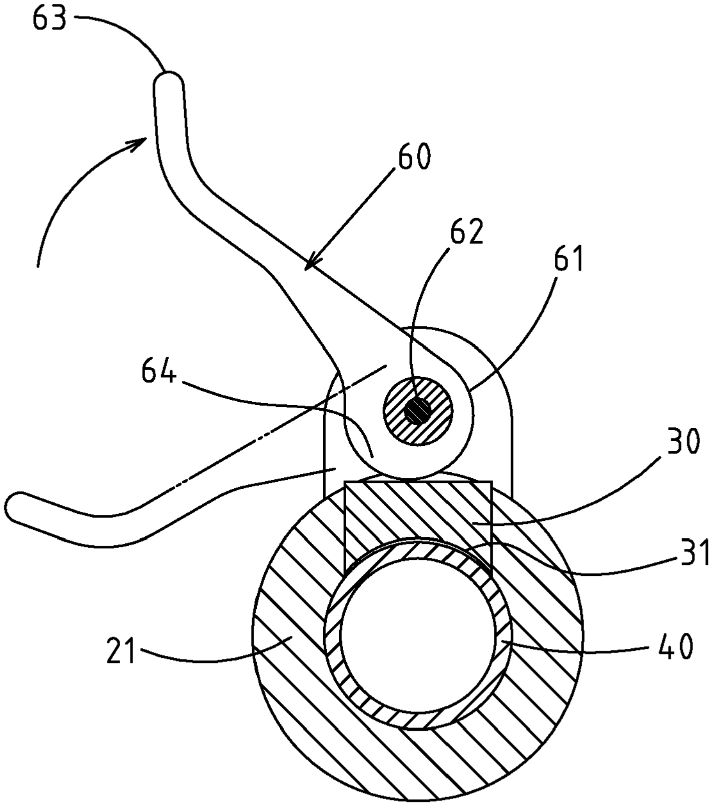
FIG. 6 shows a cross-sectional schematic view of the fastening member of the present invention in the unfastening state.

As shown in FIG. 5, the water pipe 40 is securely fastened by the fastening unit such that the water pipe 40 is intimately embraced by the arcuate surface 31 of the inner end of the press block 30 at such time when the control lever 60 is swiveled on the pivot 62 in one direction, thereby causing the eccentric press surface 64 of the control lever 60 to push the press block 30 to move toward the water pipe 40. As the control lever 60 is swiveled again on the pivot 62 in other direction, the press block 30 is relieved of the pressure of the eccentric press surface 64 of the control lever 60, as illustrated in FIG. 6, the water pipe 40 is no longer securely embraced by the arcuate surface 31 of the press block 30. As a result, the water pipe 40 can be freely rotated or moved up and down, as illustrated in FIG. 7.

Figure 7:
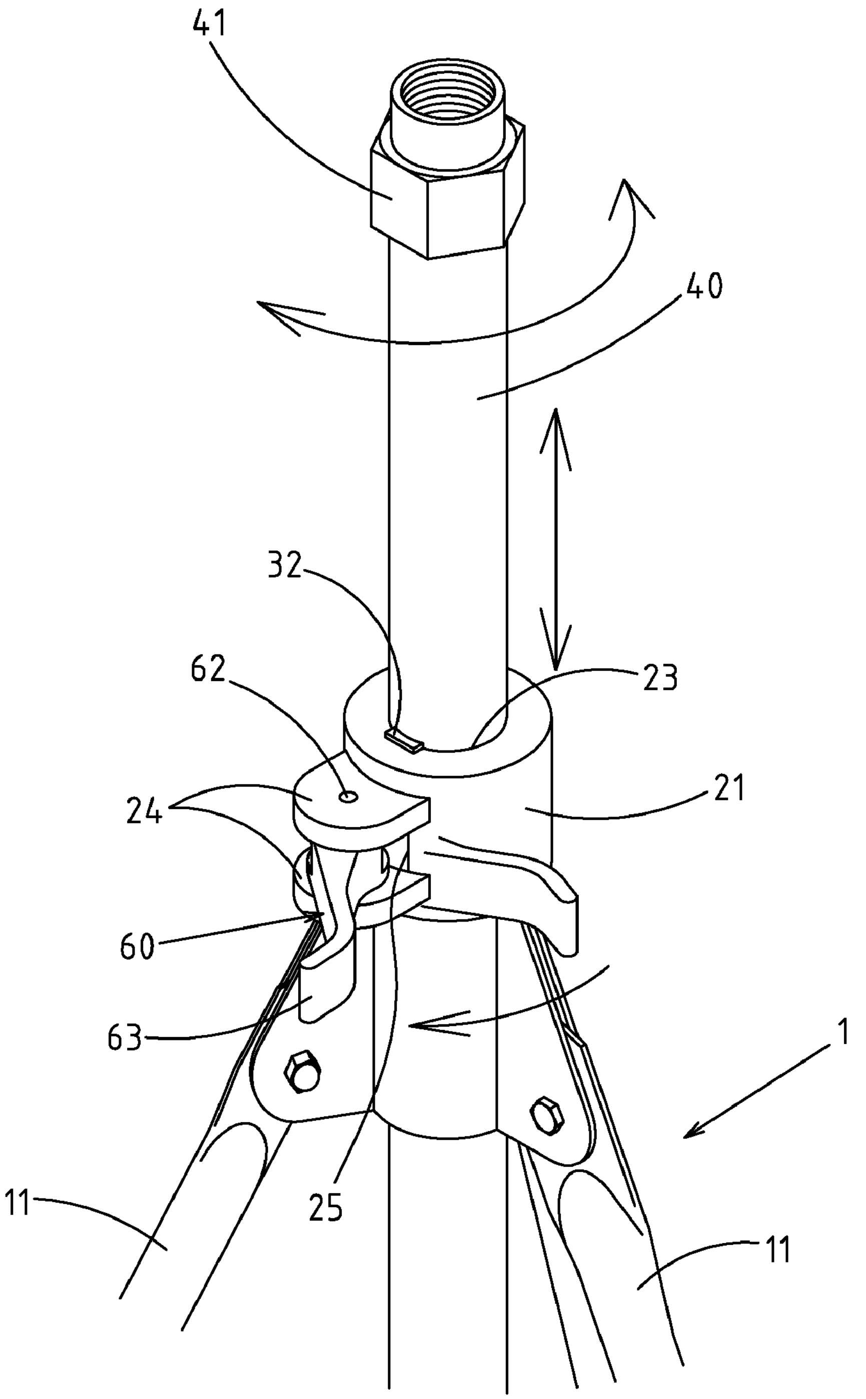
FIG. 7 is a schematic view showing that the spray unit of the present invention is rotated and moved up and down.
Figure 8:
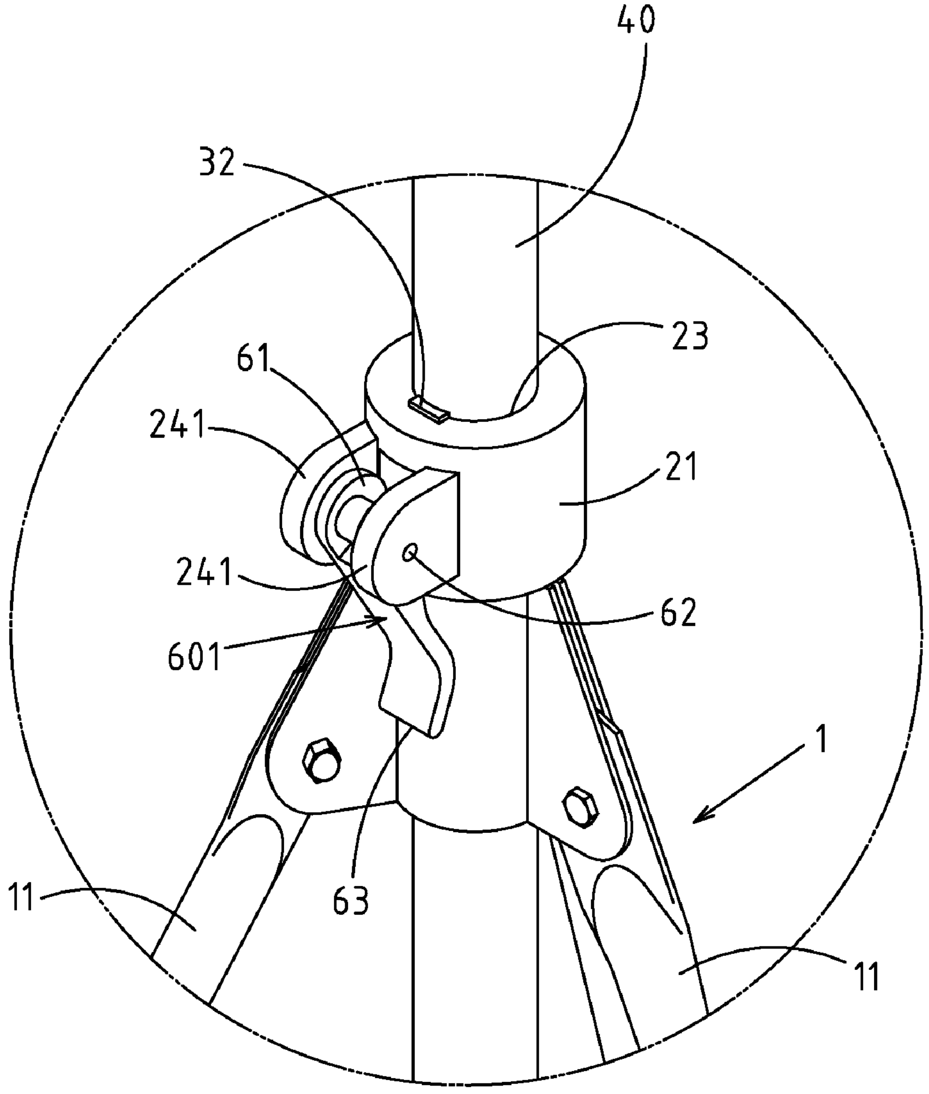
FIG. 8 shows a perspective view of the control knob of another embodiment of the present invention.

As shown in FIG. 8, the tubular seat 21 is provided with two pivoting lugs 241 for fastening pivotally a control lever 601 which is swiveled up and down rather than leftward and rightward as shown in FIG. 7.

I claim:

1. A sprinkler structure comprising:

a support unit formed of a plurality of support legs;

a spray unit uprightly supported by said support unit on a surface and formed of a water pipe and a nozzle fastened with a top end of said water pipe, said water pipe provided at a bottom end with a hose connector; and at least one fastening unit for fastening releasably said water pipe with a top end of said support legs of said support unit;

wherein said fastening unit comprises:

a tubular seat fastened at a lower portion thereof with the top end of said support legs of said support unit and provided with a center through hole extending along a longitudinal direction of said tubular seat, said center through hole being dimensioned to accommodate said water pipe loosely in such a way that said water pipe can be rotated in said center through hole, and that said water pipe can be moved up and down in said center through hole, said tubular seat further provided in an outer wall with two pivoting lugs arranged at a predetermined distance, and a through slot extending from the outer wall between said two pivoting lugs such that said through slot is in communication with said center through hole;

a press block provided at an inner end with an arcuate surface corresponding in curvature to an outer wall surface of said water pipe, said press block being disposed pivotally in said through slot of said tubular seat such that said arcuate surface of said press block is extended into said center through hole of said tubular seat; and a control lever provided at a pivoting end thereof with an eccentric press surface, said control lever being pivoted at said pivoting end thereof with said two pivoting lugs of said tubular seat such that said eccentric press surface is corresponding in location to said press block whereby said eccentric press surface pushes said press block to move toward said water pipe located in said center through hole of said tubular seat at the time when said control lever is swiveled in one direction, thereby causing said arcuate surface of the inner end of said press block to embrace intimately said water pipe, said arcuate surface of said press block capable of releasing said water pipe at the time when said control lever is swiveled in other direction, thereby relieving said press block of pressure of said eccentric press surface of said control lever.

2. The sprinkler structure as defined in claim 1, wherein said center through hole of said tubular seat is provided in an inner wall with a locating slot extending from an inner end of said through slot of said tubular seat through a top end of said center through hole of said tubular seat; wherein said press block is provided at the inner end with a projection extending therefrom in the longitudinal direction of said tubular seat whereby said projection of said press block is received in said locating slot of said center through hole of said tubular seat.

* * * * *